United States Patent [19]
Holmes

[11] Patent Number: 5,772,420
[45] Date of Patent: Jun. 30, 1998

[54] GREASELESS MOLD CARRIER AND ALIGNMENT SYSTEM

[76] Inventor: Henry T. Holmes, 4400 Wimbledon Dr., Lawrence, Kans. 66049

[21] Appl. No.: 767,388

[22] Filed: Dec. 16, 1996

[51] Int. Cl.[6] .................................................. B29C 45/64
[52] U.S. Cl. ........................ 425/588; 425/450.1; 425/589
[58] Field of Search .................................... 425/190, 588, 425/589, 450.1

[56] References Cited

U.S. PATENT DOCUMENTS

| | | | |
|---|---|---|---|
| 4,090,837 | 5/1978 | Balevski et al. | 425/588 |
| 4,150,625 | 4/1979 | Cowan | 104/119 |
| 4,309,164 | 1/1982 | Egger et al. | 425/589 |
| 4,315,728 | 2/1982 | Hehl | 425/589 |
| 4,408,981 | 10/1983 | Brown | 425/589 |
| 4,453,912 | 6/1984 | Hehl | 425/589 |
| 4,530,655 | 7/1985 | Hehl | 425/589 |
| 4,753,592 | 6/1988 | Kaaden | 425/588 |
| 4,810,181 | 3/1989 | Ozawa | 425/190 |
| 4,929,166 | 5/1990 | DiSimone et al. | 425/589 |
| 5,145,353 | 9/1992 | Zakich | 425/588 |
| 5,161,926 | 11/1992 | Schulz | 409/235 |
| 5,314,327 | 5/1994 | Stein | 425/589 |
| 5,324,192 | 6/1994 | Zakich | 425/575 |
| 5,328,346 | 7/1994 | Kodric | 425/589 |
| 5,338,171 | 8/1994 | Hayakawa et al. | 425/138 |
| 5,356,279 | 10/1994 | Fuller et al. | 425/186 |
| 5,454,709 | 10/1995 | Leonhartsberger et al. | 425/589 |
| 5,578,333 | 11/1996 | Schad et al. | 425/588 |

*Primary Examiner*—James P. Mackey
*Attorney, Agent, or Firm*—Litman, McMahon and Brown, L.L.C.

[57] ABSTRACT

A greaseless mold carrier and alignment system includes a tie rod bracket on each of a pair of lower tie rods of an injection molding machine. Each tie rod bracket has a top bearing plate and a side bearing plate. A center mold section of a stack mold assembly has mold brackets connected to opposite sides thereof, each mold bracket having sets of bearing rollers rotatably supported thereon to engage respective bearing plates. The system provides moving vertical support and lateral alignment to the center mold section for precise engagement with stationary and movable mold sections of the stack mold assembly of the molding machine.

18 Claims, 5 Drawing Sheets

GREASELESS MOLD CARRIER AND ALIGNMENT SYSTEM

BACKGROUND OF THE INVENTION

A great many products in a wide range of sizes are manufactured of synthetic resins or plastics by molding processes, such as by injection molding. Plastic products are manufactured in mass quantities with high degrees of economy and quality by the use of precision mold components which allow the manufacture of a number of product units on each molding machine cycle. Injection molding machines typically use two part molds which are brought together to form a mold cavity by action of a hydraulic cylinder. When the mold halves are sealed, a resin heated to a "plastic" state is injected at high pressure into the mold cavity and conforms to the shape of the mold cavity. After a cooling interval, the mold components are separated, and the formed product is ejected.

In a common type of molding machine, a vertically oriented stationary plate or platen has a stationary mold component mounted on it. A plurality of cylindrical tie rods extend horizontally from the stationary plate, and a movable platen, having a movable mold component mounted thereon, is slidably received on the tie rods. A hydraulic ram or cylinder engages the movable platen to urge the movable mold component into sealing engagement with the stationary mold component. The hydraulic cylinder not only moves the movable mold, but must provide a force for maintaining a seal within the mold cavity or cavities against the pressure of the injected resin.

In a stack mold arrangement, a center mold section is positioned between the stationary mold section and the movable mold section and has a centering mechanism, such as a rack and pinion mechanism, engaged between it and the stationary and movable molds to maintain the center mold section centered between them as the movable mold section is moved to close the arrangement. The center mold mechanism has mold components, such as mold cavities or mold cores, on opposite sides thereof to cooperate with opposite mold components on the stationary and movable mold sections.

The center mold section of a stack mold arrangement is conventionally supported by a carrier connected by a carrier bracket to the center mold section and frictionally engaging a pair of lower tie rods of the molding machine. The areas of contact of the center section carriers with the tie rods are lubricated to assure smooth movement and to minimize friction. The mold sections have so-called leader pins which move in and out of bushings in the opposite, facing mold sections to maintain precise alignment of the core and cavities of the mold sections. The leader pins are also lubricated to function properly.

The lubricants on the tie rods and the leader pins are sources of contamination for the plastic products as they are ejected from the molds. Because of the nature of the typical processes, the ejected parts fall from the molds to conveying systems that transfer them to automatic stacking devices or hand packing stations. The oil and grease contaminated parts contaminate other parts, the conveying systems, and the packing stations. When this happens, the process is normally shut down and cleaned or scheduled for periodic cleaning. Some products cannot tolerate any form of contamination, such as plastic products for food packaging, medical and pharmaceutical packaging, and the like. In such cases, any contaminated products must be scrapped. There are several methods for controlling contamination problems and minimizing losses resulting therefrom. The most common is some form of robot or extractor. However, such measures are expensive, tend to slow the manufacturing process, and are costly to maintain.

The sliding contact of the center mold section carriers with the lower tie rods causes wear on the carriers and the tie rods. Such wear displaces the center mold section relative to the stationary and movable molds. Such downward displacement of the center mold causes wear on the leader pins. Wear of the leader pins causes misalignment of the taper locks between mold cavities and corresponding mold cores, whereby the taper locks no longer function as designed.

Frictional contact between the center mold carriers also generates heat which can distort the geometry of the mold support system, causing misalignment of the leader pins and their bushings. Distortions of the framework of the molding machine can change the force required to close the mold. Molding machines are typically designed with features to protect the molds which require that the mold closing forces remain constant. Expansion of components of the machine can accelerate the consumption of lubricants thereby increasing the required mold closing force. This problem can be overcome by adjustments to the machine; however, if the adjustment is not reset after relubrication, which is required several times a day, the mold can slam closed, thus defeating the mold protection features. Variations in the closing force can also cause wear to the centering mechanism of the center mold section.

Frictional contact between the carriers and the tie rods also wears the tie rods which can cause damage to bushings in the movable platen which contact the tie rods. To prevent damage to the bushings, the tie rods must be rotated and, eventually, replaced. Such repair is not only expensive in itself, but requires that the molding machine be taken out of production, causing further economic losses.

SUMMARY OF THE INVENTION

The present invention provides a greaseless mold carrier and alignment system which overcomes many of the problems associated with conventional center mold section carriers. The system of the present invention provides hardened plates on the tie rods and bearing rollers mounted on brackets on the center mold section. Rolling contact of the bearing rollers on the bearing plates replaces the marginally adequate lubricated frictional contact of the carriers with tie rods of conventional center mold section support arrangements. The alignment system provides support to the center mold section in vertical and lateral directions.

A tie rod mounting saddle is positioned on each lower tie rod and has a top bearing plate and a side bearing plate. The top plate has an upwardly facing bearing surface, and the side plate has a laterally facing bearing surface. The bearing surfaces are hardened to resist wear. Side plates on opposite sides of the center mold section face in opposite directions. Mold mounting brackets extend from the center mold section and have L-shaped roller mounting brackets at their lower ends. The roller mounting brackets have vertical and lateral sets of bearing rollers positioned to engage the associated bearing plates. The bearing rollers are hardened to resist wear. Preferably, the sets of bearing rollers and bearing plates are arranged in such a manner as to support the center mold section vertically and laterally, to maintain precise alignment of the center mold section with the stationary and movable mold sections.

Use of the greaseless mold carrier and alignment system of the present invention eliminates the need for the lower leader pins and their lubricants. Additionally, lubrication on the tie rods is eliminated. Thus, these sources of contamination are removed. Additionally, frictionally generated thermal distortions of the mold machine and wear of the tie rods, tie rod bushings, and leader pins is eliminated, along with the problems they induce. The working life of the mold sections and the tie rods is greatly increased, and downtime for molding machine adjustments and repair are greatly decreased.

OBJECTS AND ADVANTAGES OF THE INVENTION

The principal objects of the present invention are: to provide an improved injection molding machine; to provide, particularly, improved support for a center mold section of a stack mold type of injection molding machine; to provide a greaseless mold carrier and alignment system which eliminates sources of lubricant contamination of products manufactured by the molding machine and greatly reduces friction generated in supporting the moving center mold section; to provide such a system including hardened bearing plates mounted on tie rods of the molding machine and sets of bearing rollers rotatably supported on brackets extending from the center mold section; to provide such a system which movably supports the center mold section vertically and horizontally to maintain precise alignment of the center mold section with stationary and movable mold sections of the molding machine; to provide such a system which eliminates thermally induced distortions of the geometry of the molding machine resulting from friction between components supporting the center mold section; to provide such a system which eliminates frictional wear on tie rods, tie rod bushings, leader pins, and the mold sections; to provide such a system which greatly extends the useful life of the mold sections and the tie rods; to provide such a system which can be retrofitted to existing molding machines as well as be incorporated into newly designed molding machines; to provide such a system which can be installed over tie rods worn to a certain degree by conventional center mold section support arrangements, thus extending the useful life of such tie rods; to provide such a system which reduces down time of the molding machine for adjustments, lubrication, and repairs thereby increasing the productivity of the molding machine; to provide such a system which maintains the quality of the manufactured product for a reduced rate of rejects for contamination or manufacturing defects; and to provide such a greaseless mold carrier and alignment system which is economical to manufacture, which is efficient and precise in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a greaseless mold carrier and alignment system (FIG. 2) which embodies the present invention. The system 1 is an improvement of a conventional carrier arrangement 2 (FIG. 1) for movably supporting a center mold section 3 of a stack mold assembly 4 of an injection molding machine 5. The system 1 generally includes a tie rod saddle or bracket 6 (FIG. 5) positioned on a tie rod 7 of the machine 5 and having bearing plates 8 and 9 mounted thereon, a mold bracket assembly 10 connected to the center mold section 3, and sets 11 and 12 of bearing rollers rotatably supported on the bracket assembly 10 and engaging the bearing plates 8 and 9 respectively.

Figure 1:
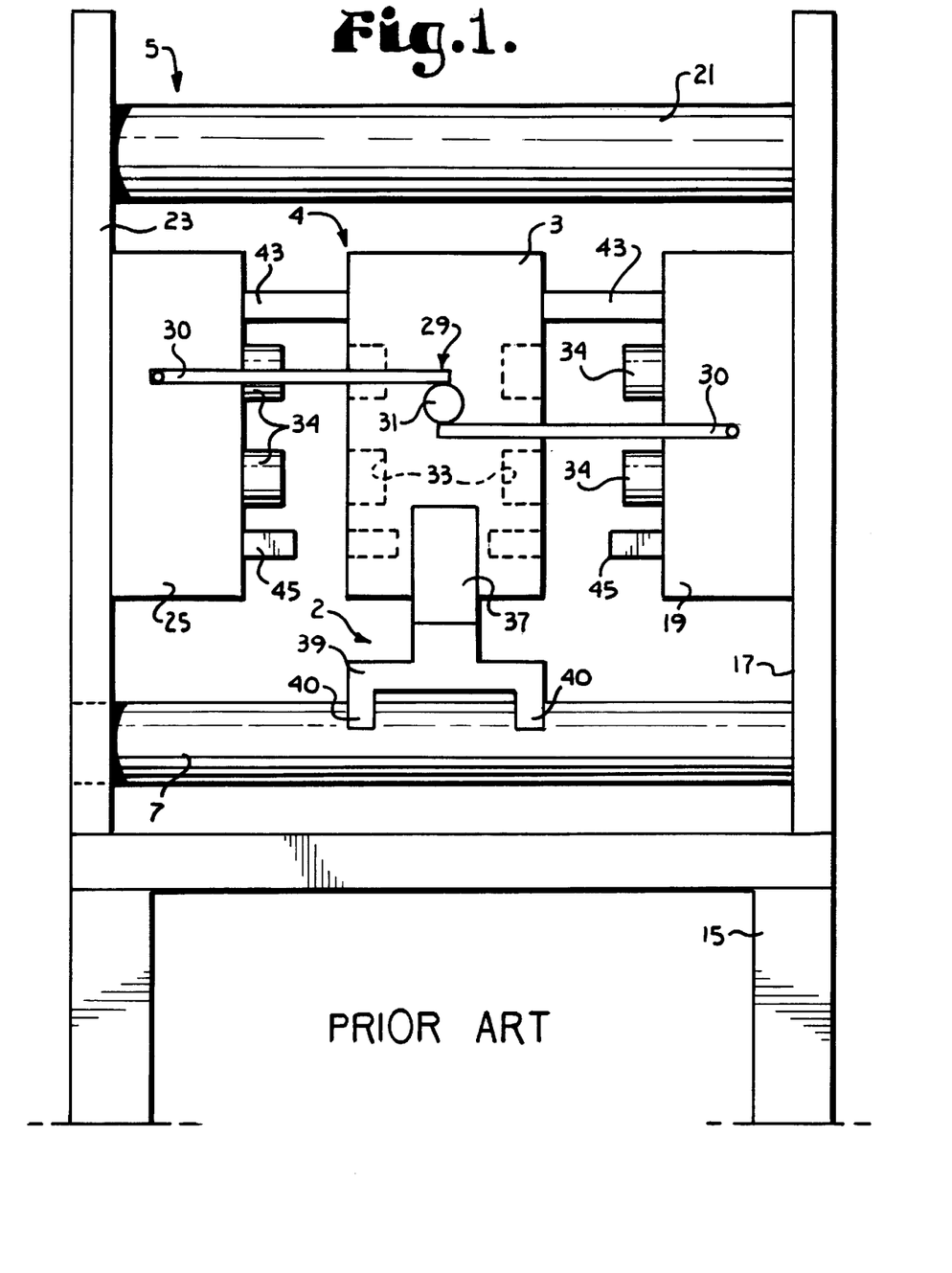
FIG. 1 is a fragmentary side elevational view of stack mold assembly of an injection molding machine and illustrates a conventional support structure for the center mold section.
Figure 2:
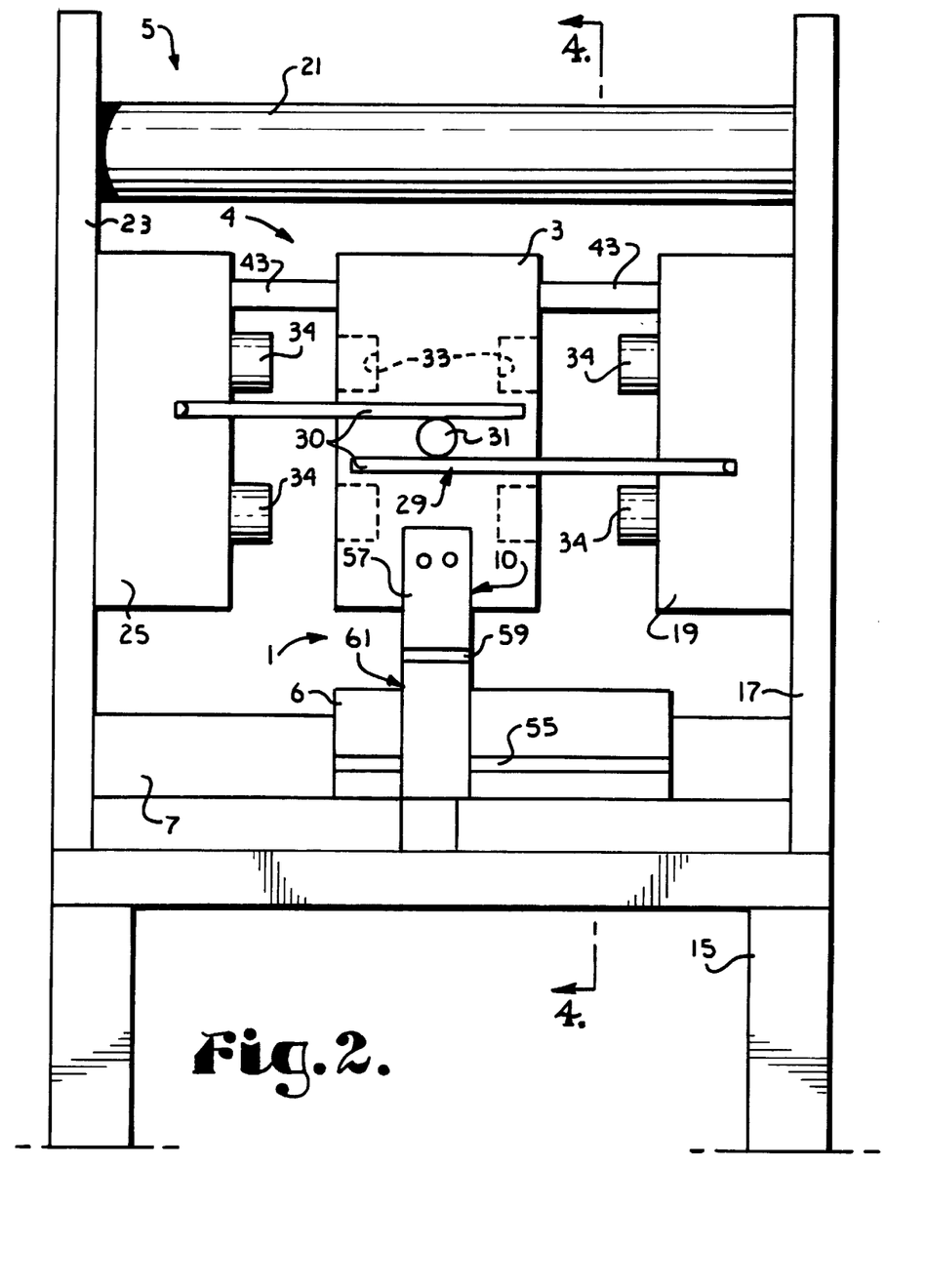
FIG. 2 is a fragmentary side elevational view of a stack mold assembly of an injection molding machine and illustrates a greaseless mold carrier and alignment system for a center mold section which embodies the present invention, the sections of the mold being shown in a separated or open condition.
Figure 3:
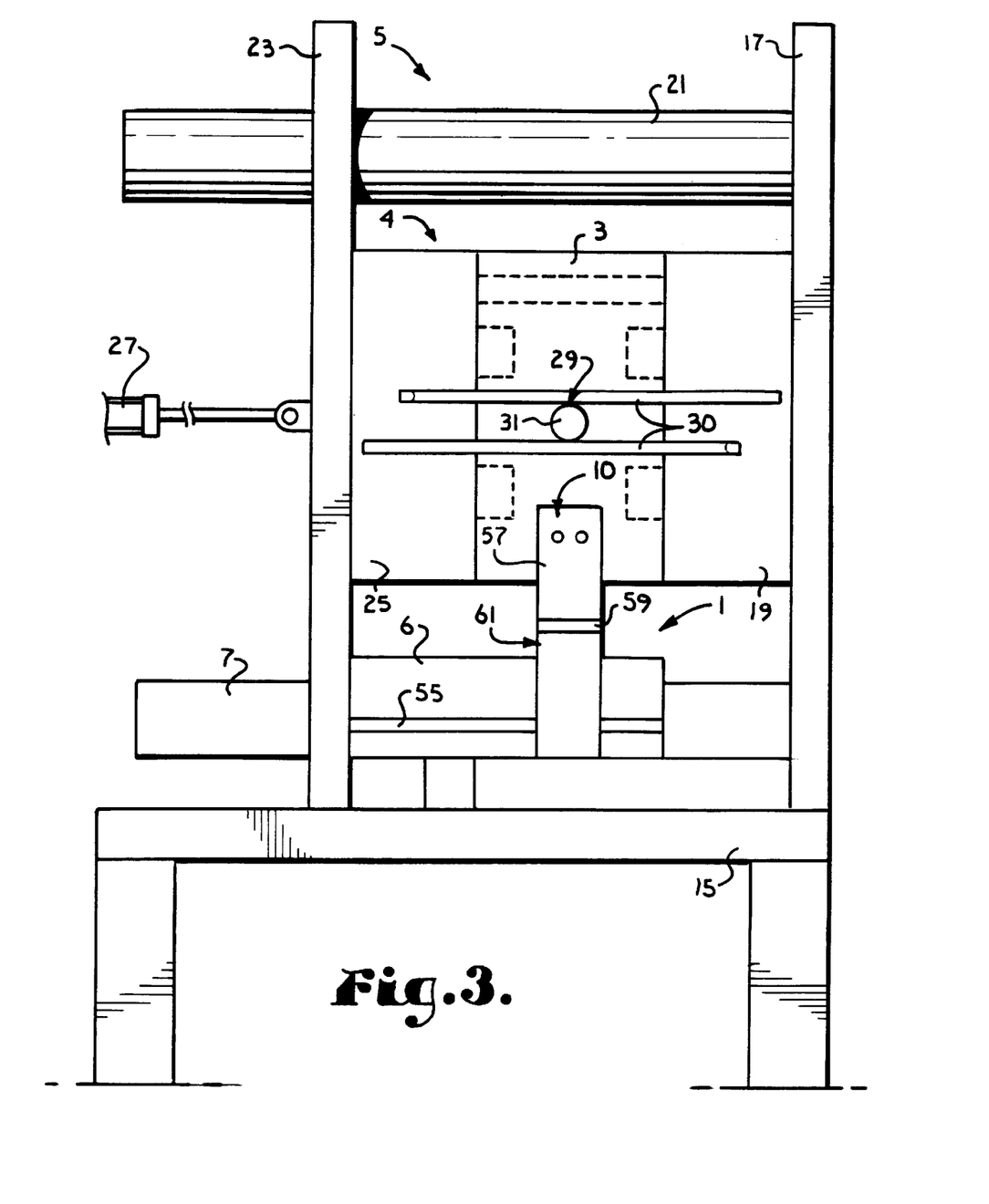
FIG. 3 is a view similar to FIG. 2 and illustrates the sections of the mold in a closed condition.

FIGS. 1 and 2 show similar views respectively of the molding machine 5 with the conventional mold support 2 and the system 1 of the present invention. Corresponding parts of FIGS. 1 and 2 are numbered the same. The molding machine 5 includes a machine framework 15 which supports a stationary platen 17 having a stationary mold section 19 mounted thereon. A pair of the lower cylindrical tie rods 7 and a pair of upper cylindrical tie rods 21 extend horizontally from the stationary platen 17. A movable platen 23 is slidably received on the tie rods and has a movable mold section 25 mounted thereon. The movable platen 23 is moved toward and away from the stationary platen 17 by a hydraulic cylinder 27 (FIG. 3). The center mold section 3 is supported between the stationary mold section 19 and the movable mold section 25 and is dynamically maintained centered therebetween during movement of the movable mold section 19 by a center mechanism 29, illustrated as a set of racks 30 and a pinion 31, mounted on opposite sides of the center mold section 3 and engaging the stationary mold section 19 and the movable mold section 25.

The mold sections 3, 19, and 25 have shapes formed thereon and therein to form plastic products by operation of the molding machine 5. In FIGS. 1–4, the center mold section 3 is illustrated to have mold cavities 33 formed therein, while the stationary mold section 19 and movable mold section 25 have mold cores 34 extending outwardly therefrom. The mold cores 34 are received within the mold cavities 33 when the stack mold set 4 is closed to form recesses to receive molten plastic injected thereinto. The mold sections 3, 19, and 25 have internal passages (not shown) formed therein through which the plastic is injected and may also have coolant passages (not shown) through which a coolant is circulated to set the injected plastic. The exemplary mold sections 3, 19, and 25 illustrated are shaped to form open topped cylindrical containers (not shown).

Referring to FIG. 1 only, the conventional center mold support 2 includes mold brackets 37 connected to opposite sides of the center mold section 3. A mold carrier 39 is connected to a lower end of each bracket 37 and has cylindrically recessed pads 40 which frictionally engage the lower tie rods 7. Upper leader pins 43 extend between the stationary mold section 19 and the center mold section 3 and between the movable mold section 25 and the center mold section 3 to maintain alignment between the center mold section 3 and the mold sections 19 and 25. In combination with the conventional center mold support arrangement 2 only, lower leader pins 45 are employed. The leader pins 43 and 45 may extend from the mold sections 19 and 25 and into the mold center section 3, from the center mold section 3 into the mold sections 19 and 25, or in such a combination as spatial design permits.

The mold sections 3, 19 and 25 may range in size to several meters and are consequently very heavy. Because of the thrust of the pads 40 upon the lower tie rods 7 and the friction generated in sliding the pads 40 along the lower tie rods 7 can be considerable. To minimize friction, lubricants, such as greases, are commonly applied between the pads 40 and the lower tie rods 7. Additionally, lubricants are required on the leader pins 43 and 45 to reduce friction and wear. Lubricants on the lower leader pins 45 and the lower tie rods 7 are sources of contamination to the manufactured products and to equipment downstream of the molding machine 5. Additionally, despite the presence of the lubricants, wear between the pads 40 and lower tie rods 7 occurs and frictional heat is generated causing expansion of the support arrangement 2 and the lower tie rods 7, both of which cause misalignment of the center mold section 3 with the mold sections 19 and 25.

Referring to FIGS. 2–5, the greaseless mold carrier and alignment system 1 of the present invention substitutes rolling contact of the bearing roller sets 11 and 12 respectively with the bearing plates 8 and 9 for the lubricated sliding contact of the pads 40 on the lower tie rods 7. The tie rod saddle or bracket 6 is of a rectangular prismatic form which is recessed at 49 (FIG. 5) to receive one of the lower tie rods 7 therein. The upper bearing plate 8 is inset into an upper surface 51 of the tie rod bracket 6, and the side bearing plate 9 is inset into a lateral surface 53 of the tie rod bracket 6. The plates 8 and 9 are preferably formed of a metal alloy and have respective bearing surfaces 54 and 55 with a hardness rating of 60 on the Rockwell scale. The bearing plates 8 and 9 are preferably replaceable should unexpected wear or damage thereto occur.

Figure 5:
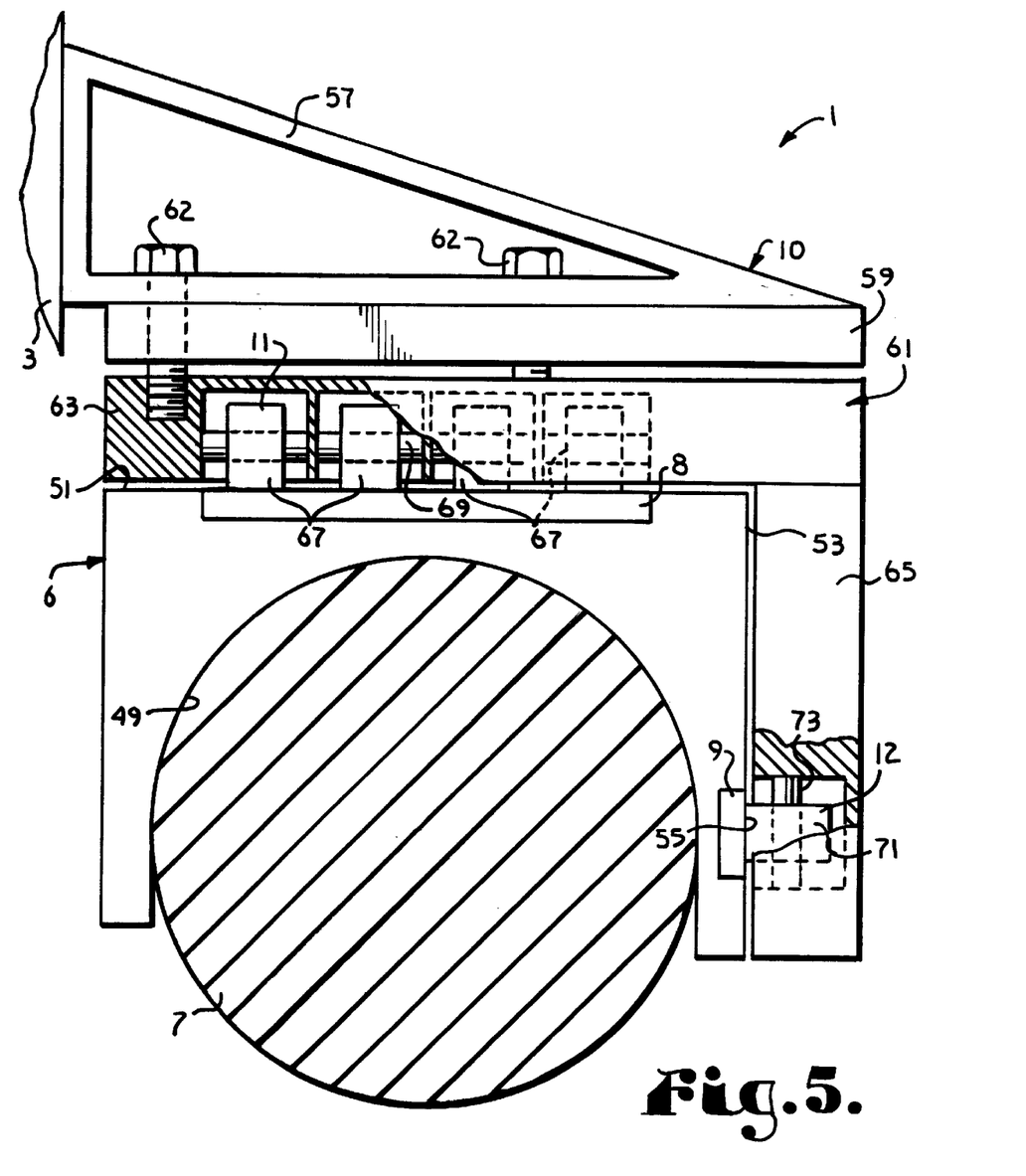
FIG. 5 is a greatly enlarged fragmentary transverse sectional view across one of the lower tie rods and illustrates details of the bearing rollers and bearing plates of the greaseless mold carrier and alignment system of the present invention.

The illustrated mold bracket assembly 19 includes a triangular upper bracket 57 which is connected to a side surface of the center mold section 3. A mounting plate 59 is connected on a lower side of the upper bracket 57. Below the mounting plate 59, an inverted L-shaped roller bracket 61 is connected to the mounting plate 59 by adjustable fasteners such as bolts 62. The roller bracket 61 includes a horizontal top leg 63 and a vertical side leg 65. The illustrated spacing between the mounting plate 59 and the top leg 63 allows some adjustment to precisely position the system 1 between the center mold section 3 and the lower tie rod 7.

Figure 4:
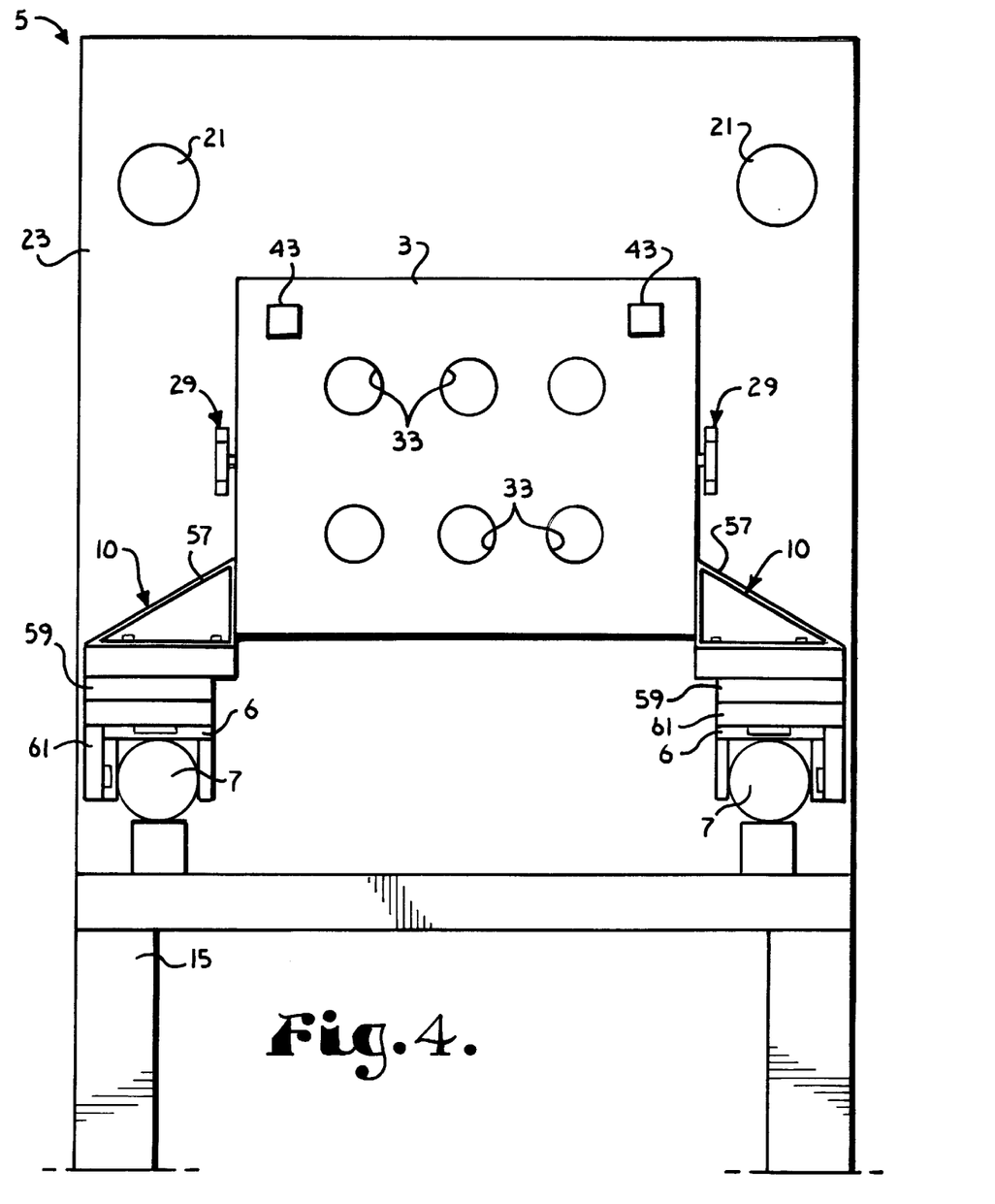
FIG. 4 is a fragmentary transverse sectional view taken on line 4—4 of FIG. 2 and illustrates further details of the greaseless mold carrier and alignment system of the present invention.

The illustrated vertically acting bearing roller set 11 includes a plurality of bearing rollers 67 mounted on laterally oriented axles 69 and recessed within the top leg 63. Similarly, the laterally acting roller set 12 includes bearing rollers 71 mounted on vertically oriented axles 73 and recessed within the side leg 65 of the roller bracket 61. The bearing rollers 67 and 71 may be of similar sizes and preferably have bearing surfaces hardened to 60 Rockwell. There are a greater number of the rollers 67 since these rollers must bear the weight of the center mold section 3. As shown in FIG. 4, the upper brackets 57 and roller brackets 61 are mirror images of one another on opposite sides of the center mold section 3 such that the respective sets 12 of the rollers 71 act in opposition against their associated side plates 9 to maintain the desired lateral position of the center mold section 3. The clearance between surfaces of the legs 63 and 65 of the roller bracket 61 and the bearing surfaces 54 and 55 is preferably on the order of 0.020 to 0.050 inch in order to keep the bearing surfaces 54 and 55 clean of dust and debris.

The rolling friction of the bearing rollers 67 and 71 respectively on the bearing surfaces 54 and 55 is orders of magnitude below the sliding friction of the carrier pads 40 on the lower tie rods 7. As a result, no lubricant is required between the bearing rollers and the bearing surfaces of the system 1, and negligible levels of frictional heat are generated. Because of the hardened bearing surfaces of the rollers 67 and 71 and the plates 8 and 9, greatly reduced levels of wear occur. Because the support for the center mold section 3 provided by the system 1 is more precise and stable over the long run, the lower leader pins 45 and their contaminating lubricants are not required. Additionally, the system 1 eliminates distortions of the components of the molding machine 5 caused by frictionally generated heat. Any wear which does occur can be repaired by replacement of the bearing plates 8 and 9 rather than the lower tie rods 7. The system 1 of the present invention, thus, extends the working life of the mold sections 3, 19, and 25 and of the lower tie rods 7 and increases the productivity of the molding machine 5 since repairs are required less frequently.

Although the system 1 of the present invention has been described and illustrated as having the bearing rollers 67 and 71 mounted on the mold bracket assembly 10 and the bearing plates 8 and 9 mounted on the tie rod bracket 6, it is envisioned that the rollers 67 and 71 could, alternatively, be mounted on the tie rod bracket 6 and the bearing plates on the mold bracket assembly 10. In addition, the tie rod sets 21 and 7 could, alternatively be connected to the movable platen 23 and slidably engage the stationary platen 17. In such a case, the tie rod brackets 6 would move with the moving tie rods 7. Finally, while the system 1 is described and illustrated as supporting a center mold section 3 of the stack mold assembly 4, the system 1 could also be useful in supporting a movable mold section such as the mold section 25 in a mold system not incorporating a center mold section 3. All such variations are considered to be within the envisioned scope of the system 1 of the present invention.

Thus, it is to be understood that while certain forms of the present invention have been illustrated and described herein, it is not to be limited to the specific forms or arrangement of parts described and shown.

What is claimed and desired to be secured by Letters Patent is as follows:

1. A support structure for a movable mold of a molding machine including a stationary mold mounted on a stationary platen; a movable platen; a generally cylindrical tie rod extending between said stationary platen and said movable platen, connected to one of the platens, and slidably engaging the other of said platens; and said movable mold being supported between said movable platen and said stationary mold and engaged with said movable platen in such a manner that movement of said movable platen causes corresponding movement of said movable mold; and said support structure comprising:

(a) a bearing plate with a substantially flat bearing surface positioned on one of said tie rod and said movable mold;
   (b) a bearing roller rotatably supported on the other of said movable mold and said tie rod so as to engage said bearing plate bearing surface; and
   (c) said plate and said roller engaging to movably support said movable mold during movement toward and away from said stationary mold and to maintain alignment of said movable mold with said stationary mold during said movement.

2. A structure as set forth in claim 1 wherein:
   (a) said bearing plate bearing surface is oriented substantially horizontally; and
   (b) said bearing roller is positioned and oriented to rotate about a horizontal axis to thereby support said movable mold in a vertical direction.

3. A structure as set forth in claim 1 wherein:
   (a) said bearing plate bearing surface is oriented substantially vertically; and
   (b) said bearing roller is positioned and oriented to rotate about a vertical axis to thereby support said movable mold in a horizontal direction.

4. A structure as set forth in claim 1 wherein:
   (a) said bearing plate is a horizontal bearing plate and said bearing surface is substantially horizontal;
   (b) said bearing roller is a vertically acting bearing roller positioned and oriented to rotate about a horizontal axis to thereby support said movable mold in a vertical direction;
   (c) a vertical bearing plate is mounted perpendicular to said horizontal bearing plate and includes a vertical, substantially flat bearing surface; and
   (d) a horizontally acting bearing roller is mounted perpendicular to said vertically acting bearing roller and is positioned and oriented to rotate about a vertical axis to thereby support said movable mold in a horizontal direction.

5. A structure as set forth in claim 1 wherein:
   (a) said movable mold is a center mold section of a stack mold assembly;
   (b) an outer movable mold is mounted on said movable platen on an opposite side of said center mold section from said stationary platen; and
   (c) a centering mechanism is engaged among said center mold section, said stationary mold, and said outer movable mold and is operative to maintain said center mold section substantially centered between said stationary mold and said outer movable mold.

6. A support structure for a movable mold of a molding machine including a stationary platen, a stationary mold supported by said stationary platen, a generally cylindrical tie rod extending horizontally from said stationary platen, and said movable mold engaged with a movable platen slidably movable along said tie rod, and said support structure comprising:

(a) a bearing plate with a substantially flat bearing surface positioned on said tie rod;
   (b) a bearing roller rotatably supported on said movable mold so as to engage said bearing plate bearing surface; and
   (c) said plate and said roller engaging to movably support said movable mold during movement toward and away from said stationary mold and to maintain alignment of said movable mold with said stationary mold during said movement.

7. A structure as set forth in claim 6 wherein:
   (a) said bearing plate bearing surface is oriented horizontally; and
   (b) said bearing roller is positioned and oriented to rotate about a horizontal axis to thereby support said movable mold in a vertical direction.

8. A structure as set forth in claim 6 wherein:
   (a) said bearing plate bearing surface is oriented substantially vertically; and
   (b) said bearing roller is positioned and oriented to rotate about a vertical axis to thereby support said movable mold in a horizontal direction.

9. A structure as set forth in claim 6 wherein:
   (a) said bearing plate is a horizontal bearing plate and said bearing surface is substantially horizontal;
   (b) said bearing roller is a vertically acting bearing roller positioned and oriented to rotate about a horizontal axis to thereby support said movable mold in a vertical direction;
   (c) a vertical bearing plate is positioned on said tie rod perpendicular to said horizontal bearing plate and includes a vertical, substantially flat bearing surface; and
   (d) a horizontally acting bearing roller is rotatably supported on said movable mold perpendicular to said vertically acting bearing roller and is positioned and oriented to rotate about a vertical axis to thereby support said movable mold in a horizontal direction.

10. A structure as set forth in claim 6 wherein:
    (a) said movable mold is a center mold section of a stack mold assembly;
    (b) an outer movable mold is mounted on said movable platen on an opposite side of said center mold section from said stationary platen; and
    (c) a centering mechanism is engaged among said center mold section, said stationary mold, and said outer movable mold and is operative to maintain said center mold section substantially centered between said stationary mold and said outer movable mold.

11. A structure as set forth in claim 6 wherein:
    (a) said bearing roller is one of a plurality of bearing rollers rotatably supported in spaced apart relation on said movable mold, said bearing rollers rotating about mutually parallel axes.

12. A support structure for a center mold of a stack mold assembly of a molding machine, said stack mold assembly including a stationary mold mounted on a stationary platen, said center mold, and a movable mold mounted on a movable platen, said movable platen being slidably mounted on a plurality of generally cylindrical tie rods extending from said stationary platen, and a centering mechanism being engaged among said movable mold, said center mold, and said stationary mold and causing said center mold to move in coordination with said movable mold to maintain a centered position between said movable mold and said stationary mold, and said support structure comprising:

(a) a bearing plate with a substantially flat bearing surface mounted on one of said tie rods;

(b) a roller bracket connected to said center mold;

(c) a bearing roller rotatably supported on said roller bracket; and (d) said plate bearing surface and said roller engaging to movably support said center mold and maintain alignment of said center mold with said movable mold and said stationary mold during movement of said center mold.

13. A structure as set forth in claim 12 wherein:

(a) said bearing plate bearing surface is oriented horizontally; and (b) said bearing roller is positioned and oriented to rotate about a horizontal axis to thereby support said center mold in a vertical direction.

14. A structure as set forth in claim 12 wherein:

(a) said bearing plate bearing surface is oriented vertically; and (b) said bearing roller is positioned and oriented to rotate about a vertical axis to thereby support said center mold in a horizontal direction.

15. A structure as set forth in claim 12 wherein:

(a) said bearing plate is a horizontal bearing plate and said bearing surface is substantially horizontal;

(b) said bearing roller is a vertically acting bearing roller positioned and oriented to rotate about a horizontal axis to thereby support said center mold in a vertical direction;

(c) a vertical bearing plate is positioned on said tie rod perpendicular to said horizontal bearing plate and includes a vertical, substantially flat bearing surface; and (d) a horizontally acting bearing roller is rotatably supported on said center mold perpendicular to said vertically acting bearing roller and is positioned and oriented to rotate about a vertical axis to thereby support said center mold in a horizontal direction.

16. A structure as set forth in claim 12 wherein:

(a) said bearing roller is one of a plurality of bearing rollers rotatably supported in spaced apart relation on said center mold, said bearing rollers rotating about mutually parallel axes.

17. A structure as set forth in claim 12 wherein:

(a) said plurality of tie rods includes a pair of tie rods on opposite sides of said center mold;

(b) a bearing plate with a corresponding substantially flat bearing surface is mounted on each of said pair of tie rods;

(c) a pair of roller brackets are connected to said center mold; and (d) a respective set of bearing rollers are rotatably supported on each of said pair of roller brackets.

18. In a molding machine including a stationary mold mounted on a stationary platen, a movable mold mounted on a movable platen, a center mold mounted between said stationary mold and said movable mold, said movable platen being slidably mounted on a pair of upper generally cylindrical tie rods and a pair of lower generally cylindrical tie rods extending from said stationary platen, said center mold section being positioned between laterally spaced sets of an upper tie rod and a lower tie rod, and a centering mechanism being engaged among said movable mold, said center mold, and said stationary mold and causing said center mold to move in coordination with said movable mold to maintain a centered position between said movable mold and said stationary mold, an improvement in a support structure for said center mold comprising:

(a) a bearing plate assembly mounted on each of said lower tie rods, each bearing plate assembly including a horizontal bearing plate with an upwardly facing, substantially flat bearing surface and a vertical bearing plate with a laterally facing, substantially flat bearing surface, the laterally facing surfaces of the bearing plate assemblies on said pair of lower tie rods facing in opposite directions;

(b) a pair of roller brackets connected to said center mold on opposite sides of said center mold;

(c) each of said roller brackets having a respective set of vertically acting bearing rollers and laterally acting bearing rollers rotatably supported thereon; and (d) each set of said vertically acting rollers engaging a respective upwardly facing bearing surface and each set of laterally acting rollers engaging a respective laterally facing bearing surface to movably support said center mold and maintain alignment of said center mold with said movable mold and said stationary mold during movement of said center mold.

* * * * *